Nov. 12, 1963   B. D. LANDES ETAL   3,110,448
BALL MILLS

Filed Feb. 23, 1961   2 Sheets-Sheet 1

INVENTORS.
BENJAMIN D. LANDES
JAMES A. MORRIS
BY Bertha L. McGregor
ATTORNEY

Nov. 12, 1963  B. D. LANDES ETAL  3,110,448
BALL MILLS
Filed Feb. 23, 1961  2 Sheets-Sheet 2

INVENTORS.
BENJAMIN D. LANDES
JAMES A. MORRIS
BY Bertha L. McGregor
ATTORNEY

United States Patent Office 3,110,448
Patented Nov. 12, 1963

3,110,448
BALL MILLS
Benjamin D. Landes, Golden, and James A. Morris, Morrison, Colo., assignors to Coors Porcelain Company, Golden, Colo., a corporation of Colorado
Filed Feb. 23, 1961, Ser. No. 91,006
2 Claims. (Cl. 241—182)

This invention relates to ball mills, particularly to a reinforced end lining construction for ball mills. Mills of the character described are provided with high strength lining brick of suitable material, such, for example, as alumina ceramic, and are used for grinding paints, enamels and other materials which must not be contaminated by contact with metal.

Conventional ball mills are generally cylindrical in shape and heretofore have been provided with either flat or dome shaped ends. The flat end construction has an advantage over the dome shaped end because flat surfaced lining bricks can be employed and installed more easily, quickly and economically than curved wedge shaped bricks such as are required for lining dome shaped mill ends. However, lining bricks mounted on flat end shell surfaces are more likely to become loose in use than are bricks attached to a concave or cylindrical surface where the lining bricks exert wedge pressure against each other which aids in holding them in place.

The main object of our invention is to produce a reinforced end lining for ball mills having flat end shells, in which the lining bricks are securely mounted and provided with reinforcing means which prevent loosening or detachment of individual bricks.

Another object of the invention is to provide lining bricks for circular flat end shell walls adapted to cover the end surfaces efficiently by the use of only two differently dimensioned forms of bricks, with minimum waste of material and trimming.

Another object of the invention is to provide reinforced end linings for flat ended ball mills in which the reinforcement means is not affected by the normal wear of the lining surfaces exposed to the balls and material in the mill which occurs in use over a period of time.

Another object is to provide an improved method of installing the end lining of our invention in a ball mill.

Other objects and advantages will be apparent from the drawings and the following specification.

Figure 1:
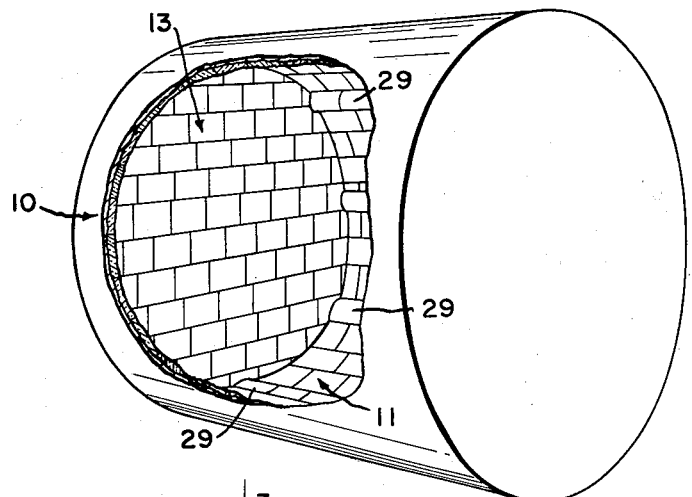
Figure 2:
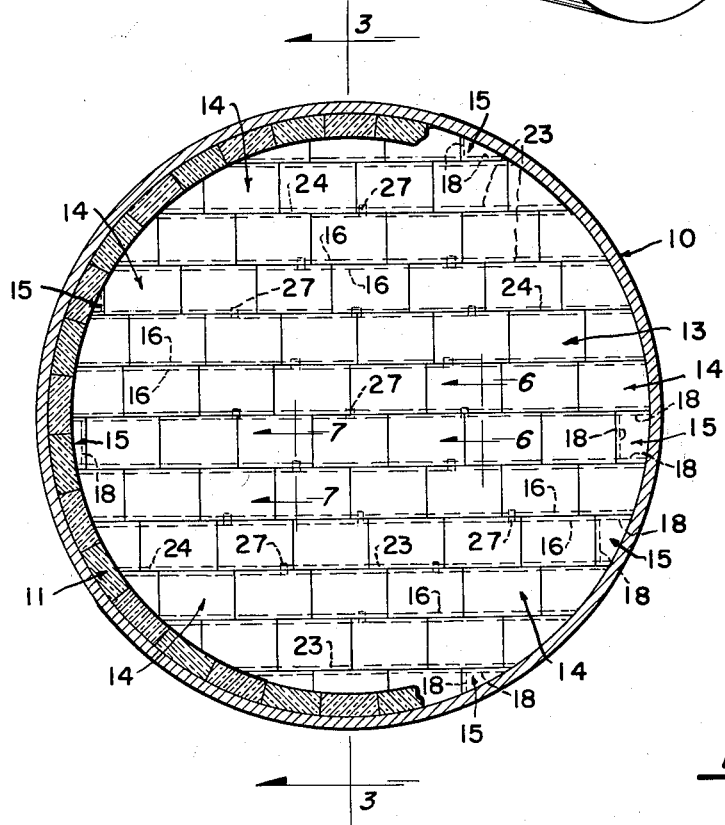
Figure 3:
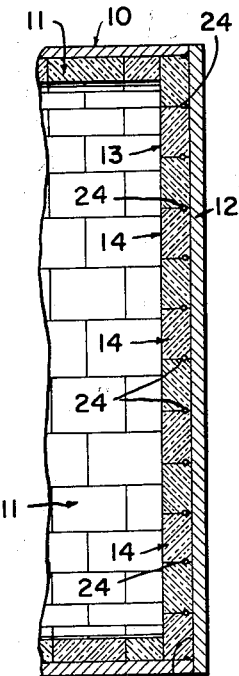
Figure 4:
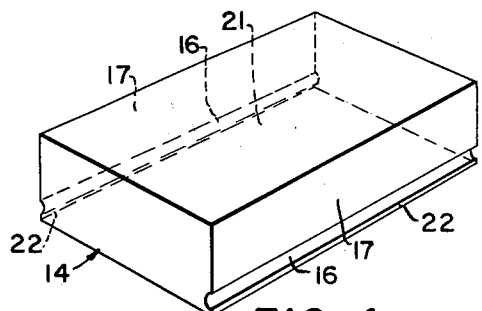
Figure 5:
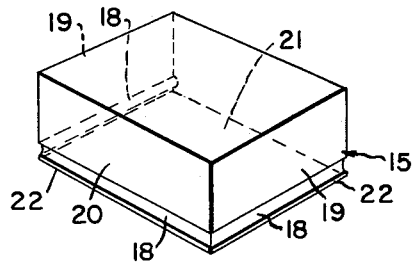
Figure 6:
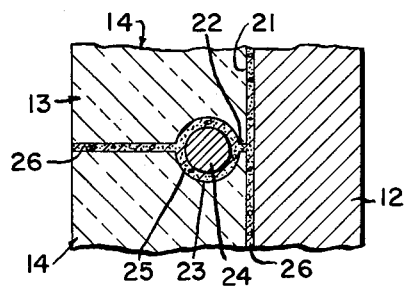
Figure 7:
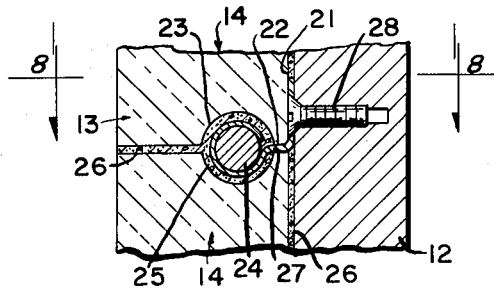
Figure 8:
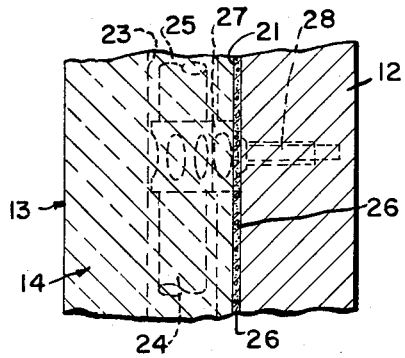

In the drawings:
FIG. 1 is an elevational perspective view of a ball mill, partly broken away to expose the lining.
FIG. 2 is a plan view of the inner surface of the mill end, showing the cylindrical or barrel portion of the mill in section with part of the lining broken away.
FIG. 3 is a sectional view in the plane of the line 3—3 of FIG. 2.
FIGS. 4 and 5 are perspective views of two differently dimensioned forms of lining brick used in the mill end construction of our invention.
FIGS. 6 and 7 are sectional views, enlarged, of alternate forms of reinforcing rod fastening means, in the planes of the lines 6—6 and 7—7, respectively, of FIG. 2.
FIG. 8 is a sectional view in the plane of the line 8—8 of FIG. 7.

In that embodiment of our invention shown in the drawings, the ball mill comprises an outer generally cylindrical shell 10 of metal provided with a ceramic lining 11, a flat end shell 12 and ceramic end lining 13.

The end lining 13 constructed in accordance with our invention comprises ceramic bricks of two different dimensions. The brick 14 shown in FIG. 4 is 4 x 6 inches on its top and bottom surfaces and may be 1½ or 2 inches in depth. The brick 15 shown in FIG. 5 is 3 x 4 inches on its top and bottom surfaces and may be 1½ or 2 inches in depth. The dimensions may be varied, but for the purposes of our invention the shorter dimension of the bricks 14 should be the same as the longer dimension of bricks 15, and both must have the same depth. The bricks 14 and 15 are flat surfaced, rectangular in shape, but differ from each other in that the bricks 14 are provided with two grooves 16, semi-circular in cross section, one on each of the two opposite long sides 17, whereas the bricks 15 are provided with three semi-circular grooves 18, one on each of the two opposite short sides 19 and a long side 20. The grooves are located adjacent the surface 21 of each brick, that is the surface which appears as the bottom surface in FIGS. 4 and 5, and faces the end shell 12 when installed, leaving a relatively narrow portion 22 between the grooves and surfaces 21.

The end lining shown in FIG. 2 is designed for a 4 ft. diameter mill, and therefore requires twelve rows of bricks 4 inches wide, the longest rows each employing eight bricks 6 inches long. The bricks are arranged in staggered relationship so that the end joints of bricks in adjacent rows are not aligned with each other. Bricks 14 comprise the greater part of the lining, with the open semi-circular grooves 16 in bricks of adjacent rows facing each other and together forming continuous, parallel passageways 23, round in cross section, between adjacent rows, extending across the mill end 12. Bricks 15 are employed at the ends of some of the rows, where it is economical to use the smaller bricks, as indicated in FIG. 2. Since the bricks 15 are provided with grooves 18 on three of their sides, they can be turned so that their longer dimension may extend either longitudinally or transversely of a particular row of bricks. As shown in FIG. 2, bricks 15 have their longer dimension extending longitudinally at the ends of the upper and lower rows of bricks, and they have been turned so that their shorter dimension extends longitudinally of the rows at one end of the fourth and ninth rows (counting from the top), and at both ends of the seventh row of bricks. This arrangement provides for staggering of the brick joints and illustrates the saving in brick material made possible by the use of the two differently dimensioned and grooved bricks 14, 15.

The passageways 23 are designed to receive reinforcing rods 24 each extending continuously across the end lining, longitudinally of the rows of bricks 14, 15. The diameter of the passageways 23 is greater than the diameter of the rods 24, leaving space for mortar or other suitable cement-like material 25. Mortar or other suitable material 26 is used in the joints between lining bricks and between the bricks and the outer shell 12.

In FIGS. 7 and 8 we have shown rod fastening clips 27 which may be used to augment the holding power of the mortar which binds the surfaces 21 of the bricks to the end shell 12. The clip 27 preferably consists of a strip of malleable perforated metal, firmly connected to the end shell by a screw 28 and having its free portion surrounding the rod 24 and embedded in the mortar 25.

The preferred method of installing the described lining is as follows: The cylindrical body 10 of the mill rests on its side so that the end shell 12 is substantially vertical. The lowermost row, as illustrated by the bottom row in FIG. 2, is placed first, preferably by positioning the center brick 14 and then the adjacent side bricks which in this embodiment are two bricks 14 and two bricks 15 which are trimmed as required to conform to the circular shape of the shell 12. The bricks of that row are mortared to each other and to the shell end; next mortar 25 is applied to the grooves 16 of bricks 14 and grooves 18 of bricks 15 and a reinforcing rod 24 is forced into the mortar 25 and partially into the semi-circular grooves 16, 18. Approximately half of the width of the rod 24 will project from said grooves, the projecting portion to be received in the grooves of the next row to be placed, which in FIG. 2 is shown composed of bricks 14. The grooves 16 of bricks 14 to be used in the second row are supplied with mortar 25 and the joint ends and sides as well as the bottom surfaces 21 are supplied with mortar 26 before they are placed in position where the grooves 16 of the second row cooperate with the grooves 16, 18, of the first row to form a passageway 23 wherein the rod 24 and mortar 25 are located.

The described installation steps are repeated with respect to each subsequently placed row of bricks. Bricks 15 are used in combination with bricks 14 where economy in material or labor is achieved, the bricks 15 being turned so their longer dimension extends either longitudinally or transversely of a particular row, as heretofore explained.

Rod fastening clips 27 may be used to augment the mortar 25, 26, preferably in the middle area of the end lining 13. One end of each strap 27 is placed around a rod 24 and bent to embrace the rod before the latter is forced into the mortar 25 in the brick grooves of one row of bricks. Then the opposite end of the strap 27 is fastened to the shell 12 by screw 28 as shown in FIGS. 7 and 8. Then the next row of bricks is placed in position so that the mortared grooves of that row cooperate with the previously placed adjacent row to form the passageway 23 which then encloses the rod 24 and clips 27 and the surrounding mortar 25 which firmly binds the parts together.

The location of the grooves 16, 18 adjacent the bottom 21 of the bricks for reception of the reinforcing rods 24 is designed to provide for normal wear of the exposed brick surfaces in use without affecting the efficiency of the reinforcing rods for their intended purposes and without exposing said rods to material in the mill.

When the complete end lining has been installed, the cylindrical shell 10 is lined as indicated at 11, the end surfaces of the bricks of the lining 11 bearing on the bricks 14 and 15 adjacent the peripheral edge of the end lining 13. The cylindrical lining 11 may include thickened bricks 29 which form a longitudinal rib in the mill lining, as shown in FIG. 1. The bearing contact between the lining 11 and the rod end anchoring bricks adjacent the periphery of the unitary end lining structure 13 also functions to firmly retain the end lining structure 13 and its reinforcement means 24 in position entirely across the flat end wall surface of the shell.

Changes may be made in the form and details of construction of the described parts without departing from the scope of the invention as defined by the appended claims. It will be understood that when the bottom of the bricks is referred to in the claims, it is intended to designate that surface which faces the shell of the mill and is opposite the exposed face of the brick regardless of the position of the mill.

We claim:

1. In a ball mill comprising a cylindrical shell and a circular flat end shell connected to an end of the cylindrical shell, a plurality of flat surfaced lining bricks covering the inner surface of said end shell, the lining bricks being arranged in parallel rows extending across the end shell, the bricks of adjacent rows being staggered relatively to each other so the end joints of bricks in each of adjacent rows are non-aligned, the improvement comprises each brick of said parallel rows being provided with at least two grooves located opposite each other on opposite surfaces of the brick adjacent its bottom, the grooves in bricks of one row facing and cooperating with grooves in bricks of an adjacent row to form continuous parallel passageways extending entirely across said flat end shell, a mortared reenforcing rod equal in length with each said passageway extending continuously from end to end of each brick of adjacent rows reenforcing supporting and tying together the bricks of said adjacent rows into a unitary structure across the flat end surface of said shell, and arcuate lining bricks covering said cylindrical shell of said mill including bricks having end surfaces bearing against said flat surfaced bricks forming the peripheral rod end anchoring portion of said unitary end lining structure thus transversely retaining the intermediate bricks of said structure by said mortared reenforcing rods firmly in position across said end wall of said shell.

2. The structure recited in claim 1, in which strap means is connected to at least one of said reinforcing rods between the anchored ends thereof and to said flat end shell of said ball mill.

References Cited in the file of this patent

UNITED STATES PATENTS

| | | |
|---|---|---|
| 937,826 | Lindhard | Oct. 26, 1909 |
| 939,637 | Rotherham | Nov. 9, 1909 |
| 1,063,672 | Flannery | June 3, 1913 |
| 2,992,782 | Taubmann et al. | July 18, 1961 |